United States Patent [19]

Bortle, Jr. et al.

[11] Patent Number: 5,266,296

[45] Date of Patent: Nov. 30, 1993

[54] COCURRENT FLOW PROCESS FOR THE MANUFACTURE OF SODIUM SULFITE AND BISULFITE SOLUTIONS

[75] Inventors: Walter H. Bortle, Jr., Cochranville, Pa.; Samuel L. Bean, Wilmington, Del.; Mark D. Dulik, West Chester, Pa.

[73] Assignee: General Chemical Corporation, Parsippany, N.J.

[21] Appl. No.: 644,213

[22] Filed: Jan. 22, 1991

[51] Int. Cl.$^5$ .............................................. C01B 17/62
[52] U.S. Cl. ............................... 423/519.2; 423/519; 423/539; 423/421
[58] Field of Search ................ 423/181, 202, 421, 519, 423/539, 512 A; 261/96, DIG. 26

[56] References Cited

U.S. PATENT DOCUMENTS

| | | | |
|---|---|---|---|
| 830,996 | 9/1906 | Heath | 423/519 |
| 1,484,818 | 2/1924 | Drewsen | 423/519 |
| 1,499,898 | 7/1924 | Wolf | 423/519 |
| 1,937,944 | 12/1933 | Butler | 23/129 |
| 2,004,799 | 6/1935 | Richardson | 23/129 |
| 2,042,477 | 6/1936 | Miller | 423/519 |
| 2,080,528 | 5/1937 | Bowman et al. | 23/129 |
| 2,147,162 | 2/1937 | Haglund | 423/519 |
| 2,245,697 | 6/1941 | Melendy | 423/519 |
| 2,656,249 | 10/1953 | Gray et al. | 23/130 |
| 2,719,075 | 9/1955 | Allen | 23/129 |
| 2,899,273 | 8/1959 | Murphy | 23/129 |
| 3,098,710 | 7/1963 | Ahlborg | 423/202 |
| 3,361,524 | 1/1968 | Spormann et al. | 23/129 |
| 3,615,199 | 10/1971 | Terrana | 23/178 |
| 3,764,653 | 10/1973 | Urban | 423/242 |
| 3,860,695 | 1/1975 | Metzger | 423/519 |
| 3,995,015 | 11/1976 | Bean | 423/519 |
| 4,003,985 | 1/1977 | Hoffman et al. | 423/512 A |
| 4,112,061 | 9/1978 | Hoffmann et al. | 423/512 A |
| 4,191,736 | 3/1980 | Chay | 423/482 |
| 4,246,245 | 1/1981 | Abrams | 423/242 |
| 4,425,313 | 1/1984 | Cooper | 423/235 |
| 4,452,766 | 6/1984 | Pike | 423/242 |

FOREIGN PATENT DOCUMENTS 1517198 4/1971 Fed. Rep. of Germany ...... 423/519

OTHER PUBLICATIONS

Benedikter, R. A., *Gmelin's Handbook*, Feb. 1, 1974.

*Primary Examiner*—Gary P. Straub
*Assistant Examiner*—Timothy C. Vanoy
*Attorney, Agent, or Firm*—Brumbaugh, Graves, Donohue & Raymond

[57] ABSTRACT

Sodium (bi)sulfites are produced by the steps of:
(a) introducing a stream of aqueous sodium carbonate into the top end of a main packed column reactor;
(b) introducing a stream of sulfur dioxide gas into the top end of the main packed column reactor concurrently with the stream of aqueous sodium carbonate;
(c) allowing the aqueous sodium carbonate and sulfur dioxide to cocurrently flow downward from the top end of the main packed column reactor to the bottom of the column in a cocurrent flow, during which flow reaction occurs between the aqueous sodium carbonate and the sulfur dioxide to produce sodium (bi)sulfite; and
(d) recovering the product sodium (bi)sulfite and a gas stream containing any excess sulfur dioxide from the bottom of the main packed column reactor. The product (bi)sulfite can be separated from the gas stream in a separate receiving vessel and then the gas is sent to a scrubber to remove residual $SO_2$. The scrubber may be a second packed column reactor operating with cocurrent flow.

5 Claims, 2 Drawing Sheets

COCURRENT FLOW PROCESS FOR THE MANUFACTURE OF SODIUM SULFITE AND BISULFITE SOLUTIONS

BACKGROUND OF THE INVENTION

This invention relates to a method for producing sodium sulfite ($Na_2SO_3$) and/or bisulfite ($NaHSO_3$) solutions (hereinafter sodium (bi)sulfite, collectively) in a packed tower apparatus.

Sodium sulfite and bisulfite can be produced from the reaction of sodium carbonate (soda ash) and sulfur dioxide in accordance with the following reactions:

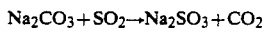

$$Na_2CO_3 + SO_2 \rightarrow Na_2SO_3 + CO_2$$

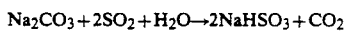

$$Na_2CO_3 + 2SO_2 + H_2O \rightarrow 2NaHSO_3 + CO_2$$

These reactions have been carried out in a number of ways, including countercurrent passage of sodium carbonate/sodium sulfite solution and $SO_2$ gas through a series of absorber vessels, and the processes described in U.S. Pat. Nos. 2,245,697 to Melendy, 3,860,695 to Metzger et al. and 3,995,015 to Bean, which patents are incorporated herein by reference.

None of these patents disclose or discuss the use of a packed tower reactor for the manufacture of sodium sulfite and/or bisulfite. The advantages of packed tower reactors include low capital, simple equipment, and high throughput rates. On the other hand, control of this sort of system must be precise all of the time it is operated. Because there is relatively little material in process there is little capacity lag so that process upsets can develop rapidly.

In general, packed tower reactors are operated with countercurrent flow (i.e., in the same manner as some of the prior methods for making sodium (bi)sulfite). In the manufacture of sodium (bi)sulfite from soda ash and sulfur dioxide a stable foam is generated. This stable, viscous foam will not flow down against the rising stream of gas in the absorption column unless the gas velocity is quite low, generally less than one foot per second. Thus, it has been discovered that countercurrent operation in a packed tower is not feasible for use in the manufacture of sodium (bi)sulfites from sodium carbonate and $SO_2$. In accordance with the invention, this problem is avoided by the use of a cocurrent flow arrangement. Cocurrent operation in a packed tower is not only feasible, it provides for surprisingly efficient operation. This invention thus provides an improved method for manufacturing (bi)sulfites using a packed column reactor with cocurrent flow.

SUMMARY OF THE INVENTION

In accordance with the invention, sodium (bi)sulfites are produced by the steps of:

(a) introducing a stream of aqueous sodium carbonate into the top end of a main packed column reactor;

(b) introducing a stream of sulfur dioxide gas into the top end of the main packed column reactor concurrently with the stream of aqueous sodium carbonate;

(c) allowing the aqueous sodium carbonate and sulfur dioxide to cocurrently flow downward from the top end of the main packed column reactor to the bottom of the column, during which flow reaction occurs between the aqueous sodium carbonate and the sulfur dioxide to produce sodium (bi)sulfite; and (d) recovering the product sodium (bi)sulfite and a gas stream containing any excess sulfur dioxide from the bottom of the main packed column reactor. The product (bi)sulfite is advantageously separated from the gas stream in a separate receiving vessel and then the gas is sent to a scrubber to remove residual $SO_2$. The scrubber may be a second packed column reactor operating with cocurrent flow.

DETAILED DESCRIPTION OF THE INVENTION

The present invention relates to a method for production of (bi)sulfites using cocurrent flow of a gas and a liquid through a packed column reactor. Cocurrent flow, and the distinction between cocurrent flow and countercurrent flow, can be understood from considerations of FIGS. 1 and 2.

Figure 1:
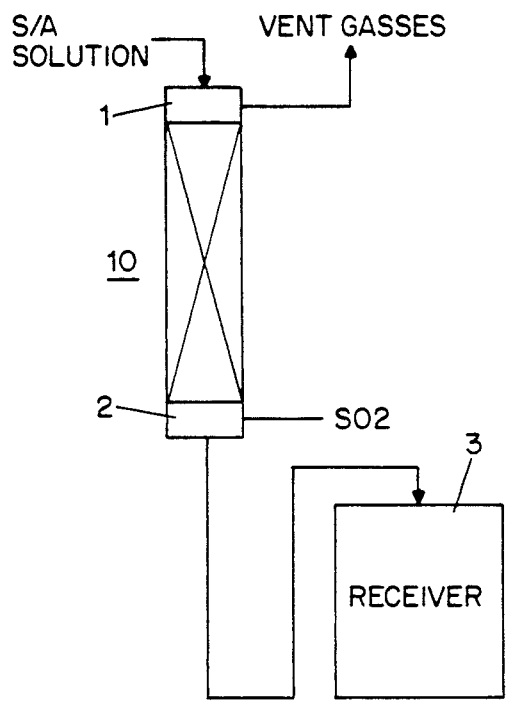
FIG. 1 shows schematically a packed column reactor with counter flow.

In FIG. 1, the reactant and product streams for a packed column reactor with countercurrent flow are shown. Reactant solution is introduced through a first, top end 1 of packed column reactor 10 and flows downward to exit through the opposite, bottom end 2 of the reactor 10. A gas stream is introduced through the bottom end 2 of the reactor 10 and bubbles upward through the reactor 10 to be vented through the top end of the reactor 10. Thus, the net flow of liquid and gaseous reactants are in opposite directions in a countercurrent flow system.

Figure 2A:
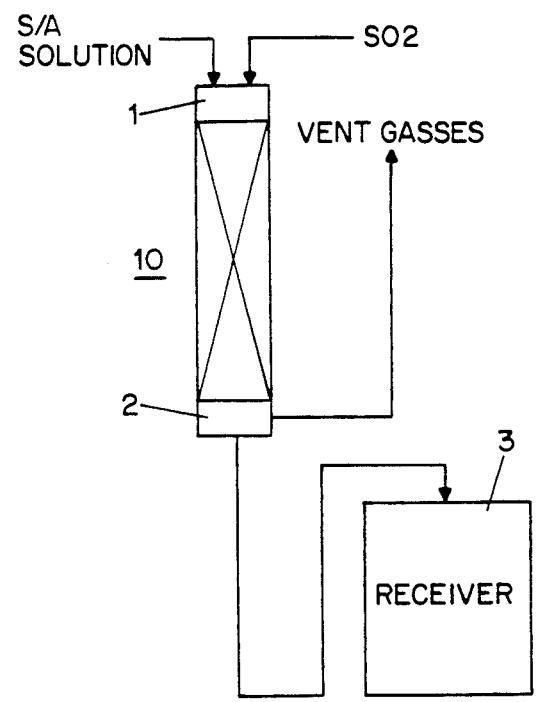
FIG. 2(a) and 2(b) show schematically two approaches to packed column reactors with coflow.
Figure 2B:
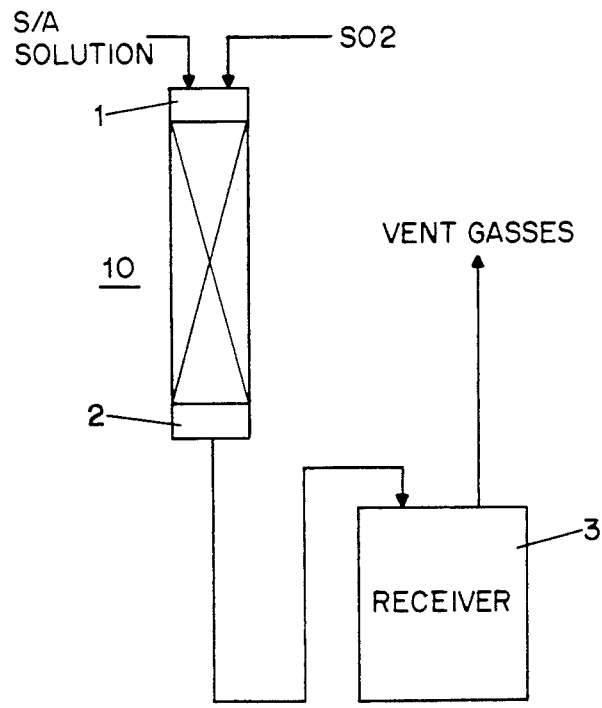

In contrast, in a cocurrent flow system, both reactant solution and reactant gases are introduced through the same (top) end 1 of the reactor 10 as shown in FIG. 2. The flow of both reactant materials is thus in the same direction and both liquid and gaseous materials are recovered at the bottom end 2 of the reactor 10. This can be accomplished by direct venting of the gas from the reactor 10 as shown in FIG. 2(a) or preferably by transportation of both gases and liquid to a receiver 3 of larger diameter than the column where venting of gases occurs as in FIG. 2(b).

In the case of the manufacture of sodium (bi)sulfite, it has been found that a cocurrent process, as shown in FIGS. 2(a) and 2(b) is far superior to a countercurrent process. A two tower system (main column plus scrubber) was therefore designed to take maximum advantage of this discovery. This two tower system is shown schematically in FIG. 3.

Figure 3:
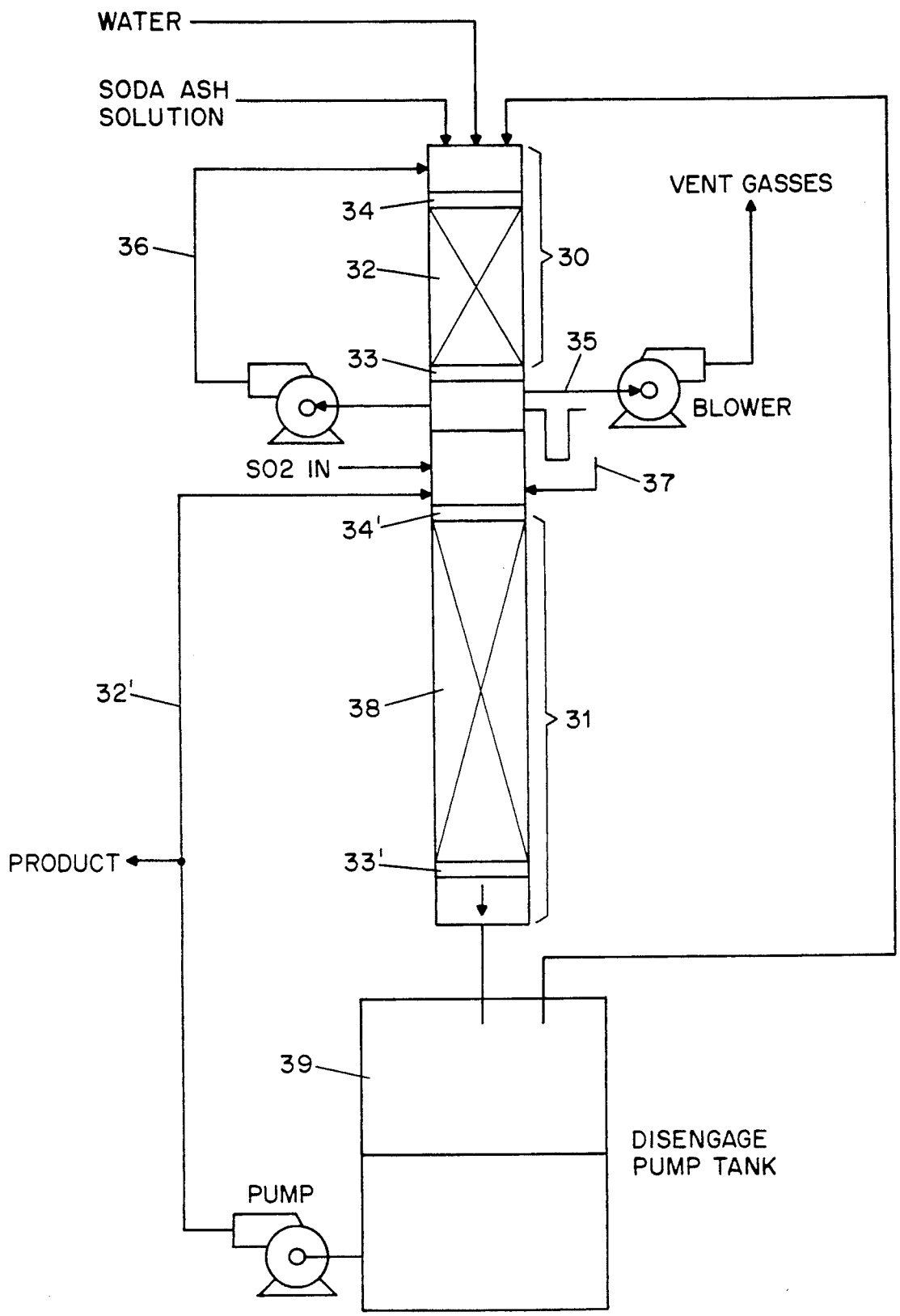
FIG. 3 shows a combination of a main absorption tower and a scrubber in accordance with the invention.

In FIG. 3, the system is formed by combining a scrubber 30 and a main absorption tower 31. In the scrubber 30, packing material 32 is disposed between a packing support 33 and liquid distributor 34. Soda ash solution, make-up water and $SO_2$-containing gases to be scrubbed are introduced through the top of the scrubber 30 and flow cocurrently down through the packing material 32 from the liquid distributor 34 to the packing support 33. After the packing support 33, the gases are discharged via a vent 35 while the liquid is either recycled via recycle line 36 or used as a feedstock in the main absorption tower 31.

The main absorption tower 31 is connected to the scrubber 30 by liquid seal 37 through which the feedstock soda ash stream flows. The feedstock soda ash stream is combined with an $SO_2$ stream in the region above the liquid distributor 34' of the main absorption tower 31 and the two streams then flow cocurrently through the packing material 38 of the main absorption tower 31. After the packing support 33', the gas-liquid mixture is conveyed to a receiver where the stream is separated into gaseous products which are fed to the scrubber 30 and liquid products which are either recovered as product or recycled via line 32' to the top of the main absorption tower 31.

The operation of systems in accordance with the invention has been tested in a pilot apparatus consisting of a four-inch diameter, ten-foot long transparent PVC pipe packed with ⅜ inch ceramic saddles. The packing support and liquid distribution plates were ¼ inch thick perforated TFE plates separated by a distance of about nine feet (i.e., the packed column length was about nine feet). It is common commercial practice to use the bottom section of an absorption column as an integral disengagement - pump tank. This separates product solution from the gas stream. In the pilot plant work with a four-inch diameter column it was not possible to make this separation within the column. It became necessary to convey the gas-liquid mixture to a fifteen-inch diameter vessel 39 in order to provide sufficient volume to effect a separation of gas from liquid. The results of these tests are set forth in the following, non-limiting examples.

COMPARATIVE EXAMPLE 1

The pilot apparatus was used to make sodium sulfite solution in a countercurrent flow mode. A soda ash solution (27 weight %) and a small water stream were fed into the top of the tower. An $SO_2$ stream (18% $SO_2$, 79% $N_2$, 3% air) was fed to the bottom of the column. Operating in this configuration with a superficial gas velocity of 1.5 feet/second, flooding of the column and accumulation of liquid above the support plate were observed soon after starting. To eliminate flooding in the tower, the superficial velocity had to be reduced to significantly less than 1 foot/second, which is usually too low to be considered acceptable commercially.

COMPARATIVE EXAMPLE 2

In an effort to obtain a workable countercurrent flow process, the length of the packed column was shortened to 45 inches and the support plate was changed to a ¼ inch TFE plate with a larger free area (more holes), specifically 51%. The liquid distribution plate had two sizes of holes, 37 of ⅛ inch diameter and 8 of ½ inch diameter. Metal tubes were inserted into the large holes from above to prevent the passage of gases from interfering with liquid distribution. As shown in Table 1, this system could only be operated at a gas velocity of 0.3 ft/sec.

EXAMPLE 1

The tower of Comparative Example 2 was used in a cocurrent flow configuration as a main absorption tower to produce sodium sulfite. Good operation was obtained with superficial gas velocity in this case of 1.5 ft/sec (i.e., 5 times higher than with counterflow).

EXAMPLE 2

The tower of Comparative Example 2 was operated as a scrubber and fed a 27% solution of sodium carbonate. As reflected in Table 1, the efficiency with which the scrubber operated was so great that there was essentially no $SO_2$ in the vent gases. Scrubber columns operated well in a countercurrent flow configuration as well, but it is believed that the tolerance of the system to upsets is greater with cocurrent flow.

EXAMPLE 3

The tower of Comparative Example 2 was used in a cocurrent flow configuration as a main absorption tower to produce sodium bisulfite on a cold day. The temperature caused difficulty in vaporizing $SO_2$ leading to a lower rate, (1.0 ft/sec), but operation was otherwise acceptable.

While the invention has been demonstrated with one pilot system it will be understood that variations in size, materials, temperatures and the like can be made without departing from the scope of the invention. For example, other packing materials such as plastic and metal in the forms of rings, short lengths of pipes, spirals and other shapes might be used with flow rates adjusted for optimal operation.

TABLE 1

| | | | | PILOT PLANT TEST RUNS | | | | |
|---|---|---|---|---|---|---|---|---|
| Ex. | Tower Being Simulated | Flow Scheme | pH of Liquid From Tower | Product | Superficial Gas Flow Rate | Recycle As a Ratio Of Production | Pressure Drop | Comments |
| Comp 2 | Main | Countercurrent | 7.04 | Sodium Sulfite | 0.3 ft/sec | 4.95 | 0.25" | 1 |
| Ex 1 | Main | Cocurrent | 6.82 | Sodium Sulfite | 1.5 ft/sec | 3.28 | NA | 2 |
| Ex 2 | Scrubber | Cocurrent | 10.08 | Sodium Bisulfite | 0.5 ft/sec | 1.87 | 3.4" | 3 |
| Ex 3 | Main | Cocurrent | 5.3 | Sodium Bisulfite | 1.0 ft/sec | 9.82 | 0.35" | 4 |

1. Gas flow rate had to be lowered to 0.3 ft/sec for the tower to operate properly
2. Good operation, good rate
3. Good operation, low rate didn't result from a problem, vent gases contained nil $SO_2$
4. Good operation, feed to main tower would have to go to a scrubber, low rate because of cold weather and difficulty vaporizing $SO_2$. Only 0.6% of $SO_2$ fed to main tower would be to go to a scrubber.

We claim:

1. A method for production of sodium sulfite or sodium bisulfite comprising the steps of:
    (a) introducing a stream of aqueous sodium carbonate into a top end of a main packed column reactor;
    (b) introducing a stream of sulfur dioxide gas into the top end of the main packed column reactor concurrently with the stream of aqueous sodium carbonate;

(c) allowing the aqueous sodium carbonate and sulfur dioxide to flow downward from the top end of the main packed column reactor toward the bottom end of the main packed column reactor in a cocurrent flow, during which flow reaction occurs between the aqueous sodium carbonate and the sulfur dioxide to produce sodium sulfite or sodium bisulfite; and (d) recovering the product sodium sulfite or sodium bisulfite and a gas stream containing any excess sulfur dioxide from the bottom end of the main packed column reactor.

2. A method according to claim 1, wherein the product sodium sulfite or sodium bisulfite and the gas stream are recovered from the main packed column reactor together and then separated in a receiving vessel.

3. A method according to claim 1, wherein the recovered gas stream is introduced to a scrubber to remove sulfur dioxide.

4. A method according to claim 3, wherein the scrubber is a second packed column reactor operated with cocurrent flow.

5. A method according to claim 4, wherein liquid effluent recovered from the scrubber is used as the stream of aqueous sodium carbonate introduced into the main packed column reactor.

* * * * *

UNITED STATES PATENT AND TRADEMARK OFFICE
CERTIFICATE OF CORRECTION

PATENT NO. : 5,266,296
DATED : November 30, 1993
INVENTOR(S) : Bortle, et. al.

It is certified that error appears in the above-indentified patent and that said Letters Patent is hereby corrected as shown below:

Title page, item [56], 10th line, "2/1937" should read --2/1939--;

Col. 4, last line of Table 1, "would be to fo" should read --would have to go--.

Signed and Sealed this

Nineteenth Day of July, 1994

Attest:

BRUCE LEHMAN

*Attesting Officer*    Commissioner of Patents and Trademarks